(12) United States Patent
Majumdar et al.

(10) Patent No.: US 11,423,323 B2
(45) Date of Patent: Aug. 23, 2022

(54) GENERATING A SPARSE FEATURE VECTOR FOR CLASSIFICATION

(71) Applicant: QUALCOMM Incorporated, San Diego, CA (US)

(72) Inventors: Somdeb Majumdar, Mission Viejo, CA (US); Regan Blythe Towal, La Jolla, CA (US)

(73) Assignee: Qualcomm Incorporated, San Diego, CA (US)

( * ) Notice: Subject to any disclaimer, the term of this patent is extended or adjusted under 35 U.S.C. 154(b) by 1124 days.

(21) Appl. No.: 15/077,873

(22) Filed: Mar. 22, 2016

(65) Prior Publication Data

US 2017/0061328 A1   Mar. 2, 2017

Related U.S. Application Data

(60) Provisional application No. 62/213,591, filed on Sep. 2, 2015.

(51) Int. Cl.
*G06N 20/00* (2019.01)
*G06N 3/08* (2006.01)
(Continued)

(52) U.S. Cl.
CPC ............. *G06N 20/00* (2019.01); *G06K 9/627* (2013.01); *G06K 9/6232* (2013.01); *G06N 3/08* (2013.01); *G06V 10/454* (2022.01); *G06K 9/6267* (2013.01)

(58) Field of Classification Search
CPC ........ G06N 20/00; G06N 3/08; G06K 9/4628; G06K 9/6232; G06K 9/627; G06K 9/6267
See application file for complete search history.

(56) References Cited

U.S. PATENT DOCUMENTS 6,633,817 B1 * 10/2003 Walker ................... G16B 30/00
    702/19
2003/0139929 A1 * 7/2003 He ........................ G10L 15/30
    704/270.1

(Continued)

FOREIGN PATENT DOCUMENTS

| CN | 102073880 A | 5/2011 |
| CN | 103106535 A | 5/2013 |
| WO | 2015066628 A1 | 5/2015 |

OTHER PUBLICATIONS

Tran et al. Demystifying Sparse Rectified Auto-Encoders. SoICT'13, Dec. 5-6, 2013, Danang, Viet Nam (Year: 2013).*

(Continued)

*Primary Examiner* — Alexey Shmatov
*Assistant Examiner* — Robert Bejcek, II
(74) *Attorney, Agent, or Firm* — Seyfarth Shaw LLP (57) ABSTRACT

An apparatus for classifying an input includes a classifier and a feature extractor. The feature extractor is configured to generate a feature vector based on the input. The feature vector is also configured to set a number of elements of the feature vector to zero to produce a sparse feature vector. The sparse feature vector has the same dimensions as the feature vector generated by the feature extractor. However, the sparse feature vector includes fewer non-zero elements than the feature vector generated by the feature extractor. The feature vector is further configured to forward the sparse feature vector to the classifier to classify the input.

18 Claims, 8 Drawing Sheets

(51) Int. Cl.
G06K 9/62 (2006.01)
G06K 9/46 (2006.01)
G06V 10/44 (2022.01)

(56) References Cited

U.S. PATENT DOCUMENTS

| | | | |
|---|---|---|---|
| 2009/0274376 A1* | 11/2009 | Selvaraj | G06K 9/6269 382/224 |
| 2010/0124377 A1 | 5/2010 | Yu et al. | |
| 2010/0161527 A1* | 6/2010 | Sellamanickam | G06F 16/51 706/12 |
| 2014/0279774 A1 | 9/2014 | Wang et al. | |
| 2015/0139559 A1* | 5/2015 | Smith | G06K 9/6215 382/225 |

OTHER PUBLICATIONS

Graham, Ben. Sparse 3D convolutional neural networks. Aug. 26, 2015. (Year: 2015).*

Yguel et al. Update Policy of Dense Maps: Efficient Algorithms and Sparse Representation. C. Laugier and R. Siegwart (Eds.): Field and Service Robotics, STAR 42, pp. 23-33, 2008. (Year: 2008).*

MathWorks Documentation Center. Strategies for Efficient Use of Memory, https://www.mathworks.com/help/matlab/matlab_prog/strategies-for-efficient-use-of-memory.html See Nov. 29, 2012 from Archive.org. (Year: 2012).*

Coates A., et al., "The Importance of Encoding Versus Training with Sparse Coding and Vector Quantization", Proceedings of the 28th International Con-ference on Machine Learning, Jul. 16, 2011 (Jul. 16, 2011), XP055312568.

Glorot X., et al., "Deep Sparse Rectifier Neural Networks" In: "Proceedings of the 14th International Conference on Artificial Intelligence and Statistics (AISTATS)", Apr. 13, 2011 (Apr. 13, 2011), JMLR, Fort Lauderdale, FL, USA, XP055312525, vol. 15, pp. 315-323.

International Search Report and Written Opinion—PCT/US2016/045636—ISA/EPO—dated Nov. 17, 2016.

Wright J., et al., "Robust Face Recognition via Sparse Representation", IEEE Transactions on Pattern Analysis and Machine Intelligence, IEEE Service Center, Los Alamitos, CA, US, vol. 30, No. 2, Feb. 1, 2009 (Feb. 1, 2009), pp. 210-227, XP011246820.

Liangbin W., et al., "SAR Image Processing and Target Recognition", AVIC Chief ExpertTechnology Series, Aviation Industry Press, National "12th Five-Year Plan", Jan. 31, 2013, 9 Pages.

Wang Y., et al., "Digital Image Processing", Recommended by Higher Education Branch, China ElectronicEducation Society Planned Textbook for 13th Five-Year Plan Curriculum Reform ofElectronic Information in General Higher Education, Published by Xidian University Society, Aug. 31, 2015, 11 Pages.

* cited by examiner

GENERATING A SPARSE FEATURE VECTOR FOR CLASSIFICATION

CROSS-REFERENCE TO RELATED APPLICATION

The present application claims the benefit of U.S. Provisional Patent Application No. 62/213,591, filed on Sep. 2, 2015, and titled "ENFORCED SPARSITY FOR CLASSIFICATION," the disclosure of which is expressly incorporated by reference herein in its entirety.

BACKGROUND

Field

Certain aspects of the present disclosure generally relate to machine learning and, more particularly, to improving systems and methods of feature extraction and classification.

Background

An artificial neural network, which may comprise an interconnected group of artificial neurons (e.g., neuron models), is a computational device or represents a method to be performed by a computational device.

Convolutional neural networks are a type of feed-forward artificial neural network. Convolutional neural networks may include collections of neurons that each have a receptive field and that collectively tile an input space. Convolutional neural networks (CNNs) have numerous applications. In particular, CNNs have broadly been used in the area of pattern recognition and classification.

Deep learning architectures, such as deep belief networks and deep convolutional networks, are layered neural networks architectures in which the output of a first layer of neurons becomes an input to a second layer of neurons, the output of a second layer of neurons becomes and input to a third layer of neurons, and so on. Deep neural networks may be trained to recognize a hierarchy of features and so they have increasingly been used in object recognition applications. Like convolutional neural networks, computation in these deep learning architectures may be distributed over a population of processing nodes, which may be configured in one or more computational chains. These multi-layered architectures may be trained one layer at a time and may be fine-tuned using back propagation.

Other models are also available for object recognition. For example, support vector machines (SVMs) are learning tools that can be applied for classification. Support vector machines include a separating hyperplane (e.g., decision boundary) that categorizes data. The hyperplane is defined by supervised learning. A desired hyperplane increases the margin of the training data. In other words, the hyperplane should have the greatest minimum distance to the training examples.

Although these solutions achieve excellent results on a number of classification benchmarks, their computational complexity can be prohibitively high. Additionally, training of the models may be challenging.

SUMMARY

In an aspect of the present disclosure, an apparatus for classifying an input is disclosed. The apparatus includes a classifier and a feature extractor. The feature extractor is configured to generate a feature vector from the input. The feature vector is also configured to set a number of elements of the feature vector to zero to produce a sparse feature vector. The sparse feature vector has the same dimensions as the feature vector generated by the feature extractor. The sparse feature vector includes fewer non-zero elements than the feature vector generated by the feature extractor. The feature vector is further configured to forward the sparse feature vector to a classifier to classify the input.

In another aspect of the present disclosure, a method for classifying an input is disclosed. The method includes generating a feature vector from the input. The method also includes setting a number of elements of the feature vector to zero to produce a sparse feature vector. The sparse feature vector has the same dimensions as the generated feature vector. The sparse feature vector also includes fewer non-zero elements than the generated feature vector. The method further includes forwarding the sparse feature vector to a classifier to classify the input.

In yet another aspect of the present disclosure, an apparatus for classifying an input is disclosed. The apparatus includes means for generating a feature vector from the input. The apparatus also includes means for setting a number of elements of the feature vector to zero to produce a sparse feature vector. The sparse feature vector has the same dimensions as the generated feature vector. The sparse feature vector also includes fewer non-zero elements than the generated feature vector. The apparatus further includes means for forwarding the sparse feature vector to a classifier to classify the input.

In still another aspect of the present disclosure, a non-transitory computer-readable medium is presented. The non-transitory computer-readable medium has encoded thereon program code for classifying. The program code is executed by a processor and includes program code to generate a feature vector from the input. The program code also includes program code to set a number of elements of the feature vector to zero to produce a sparse feature vector. The sparse feature vector has the same dimensions as the generated feature vector. The sparse feature vector also includes fewer non-zero elements than the generated feature vector. The program code further includes program code to forward the sparse feature vector to a classifier to classify the input.

Additional features and advantages of the disclosure will be described below. It should be appreciated by those skilled in the art that this disclosure may be readily utilized as a basis for modifying or designing other structures for carrying out the same purposes of the present disclosure. It should also be realized by those skilled in the art that such equivalent constructions do not depart from the teachings of the disclosure as set forth in the appended claims. The novel features, which are believed to be characteristic of the disclosure, both as to its organization and method of operation, together with further objects and advantages, will be better understood from the following description when considered in connection with the accompanying figures. It is to be expressly understood, however, that each of the figures is provided for the purpose of illustration and description only and is not intended as a definition of the limits of the present disclosure.

BRIEF DESCRIPTION OF THE DRAWINGS

The features, nature, and advantages of the present disclosure will become more apparent from the detailed description set forth below when taken in conjunction with the drawings in which like reference characters identify correspondingly throughout.

DETAILED DESCRIPTION

The detailed description set forth below, in connection with the appended drawings, is intended as a description of various configurations and is not intended to represent the only configurations in which the concepts described herein may be practiced. The detailed description includes specific details for the purpose of providing a thorough understanding of the various concepts. However, it will be apparent to those skilled in the art that these concepts may be practiced without these specific details. In some instances, well-known structures and components are shown in block diagram form in order to avoid obscuring such concepts.

Based on the teachings, one skilled in the art should appreciate that the scope of the disclosure is intended to cover any aspect of the disclosure, whether implemented independently of or combined with any other aspect of the disclosure. For example, an apparatus may be implemented or a method may be practiced using any number of the aspects set forth. In addition, the scope of the disclosure is intended to cover such an apparatus or method practiced using other structure, functionality, or structure and functionality in addition to or other than the various aspects of the disclosure set forth. It should be understood that any aspect of the disclosure disclosed may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses or objectives. Rather, aspects of the disclosure are intended to be broadly applicable to different technologies, system configurations, networks and protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

Enforced Sparsity for Classification

In a classification task, the feature vectors output via a feature extractor may often be dense (e.g., containing many non-zero elements). Having such dense feature vectors may adversely affect memory requirements and classifier latency. Further, having a large number of feature vector elements with small, non-zero feature values may represent a noisy feature vector, which in turn may reduce classification accuracy.

Aspects of the present disclosure are directed to improved feature extraction and classification accuracy. In the present disclosure, an enforced sparsity (ES) process is employed such that only a top K number or percentage of feature values or elements of a given feature vector are retained. The other values may be set to zero (0), thereby producing a sparse feature vector having fewer non-zero values than the given feature vector. The dimensions of the feature vector (e.g., the number of elements in the feature vector), however, may be maintained. By increasing the sparsity of the feature vector, less memory may be used to store features for retraining, for example. Furthermore, higher sparsity may also improve classifier performance (e.g., speed of classification and accuracy).

Figure 1:
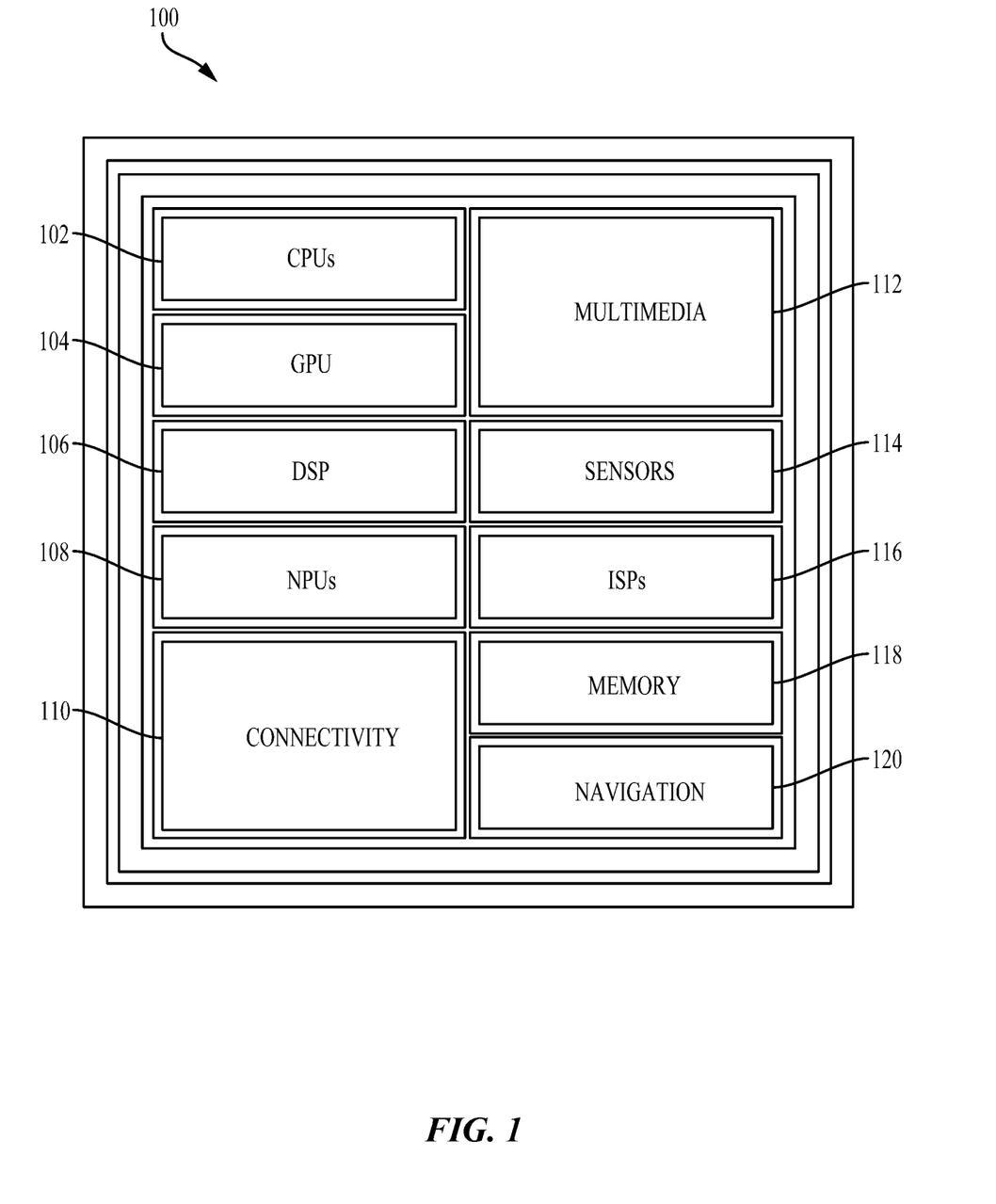
FIG. 1 illustrates an example implementation of designing a neural network using a system-on-a-chip (SOC), including a general-purpose processor in accordance with certain aspects of the present disclosure.

FIG. 1 illustrates an example implementation of the aforementioned enforced sparsity and feature extraction using a system-on-a-chip (SOC) 100, which may include a general-purpose processor (CPU) or multi-core general-purpose processors (CPUs) 102 in accordance with certain aspects of the present disclosure. Variables (e.g., neural signals and synaptic weights), system parameters associated with a computational device (e.g., neural network with weights), delays, frequency bin information, and task information may be stored in a memory block associated with a neural processing unit (NPU) 108, in a memory block associated with a CPU 102, in a memory block associated with a graphics processing unit (GPU) 104, in a memory block associated with a digital signal processor (DSP) 106, in a dedicated memory block 118, or may be distributed across multiple blocks. Instructions executed at the general-purpose processor 102 may be loaded from a program memory associated with the CPU 102 or may be loaded from a dedicated memory block 118.

The SOC 100 may also include additional processing blocks tailored to specific functions, such as a GPU 104, a DSP 106, a connectivity block 110, which may include fourth generation long term evolution (4G LTE) connectivity, unlicensed Wi-Fi connectivity, USB connectivity, Bluetooth connectivity, and the like, and a multimedia processor 112 that may, for example, detect and recognize gestures. In one implementation, the NPU is implemented in the CPU, DSP, and/or GPU. The SOC 100 may also include a sensor processor 114, image signal processors (ISPs), and/or navigation 120, which may include a global positioning system.

The SOC 100 may be based on an ARM instruction set. In an aspect of the present disclosure, the instructions loaded into the general-purpose processor 102 may comprise code for receiving a feature vector from a feature extractor. The instructions loaded into the general-purpose processor 102 may also comprise code for retaining a percentage of elements of the feature vector to produce a sparse feature vector. Furthermore, the instructions loaded into the general-purpose processor 102 may also comprise code for forwarding the sparse feature vector to a classifier.

Figure 2:
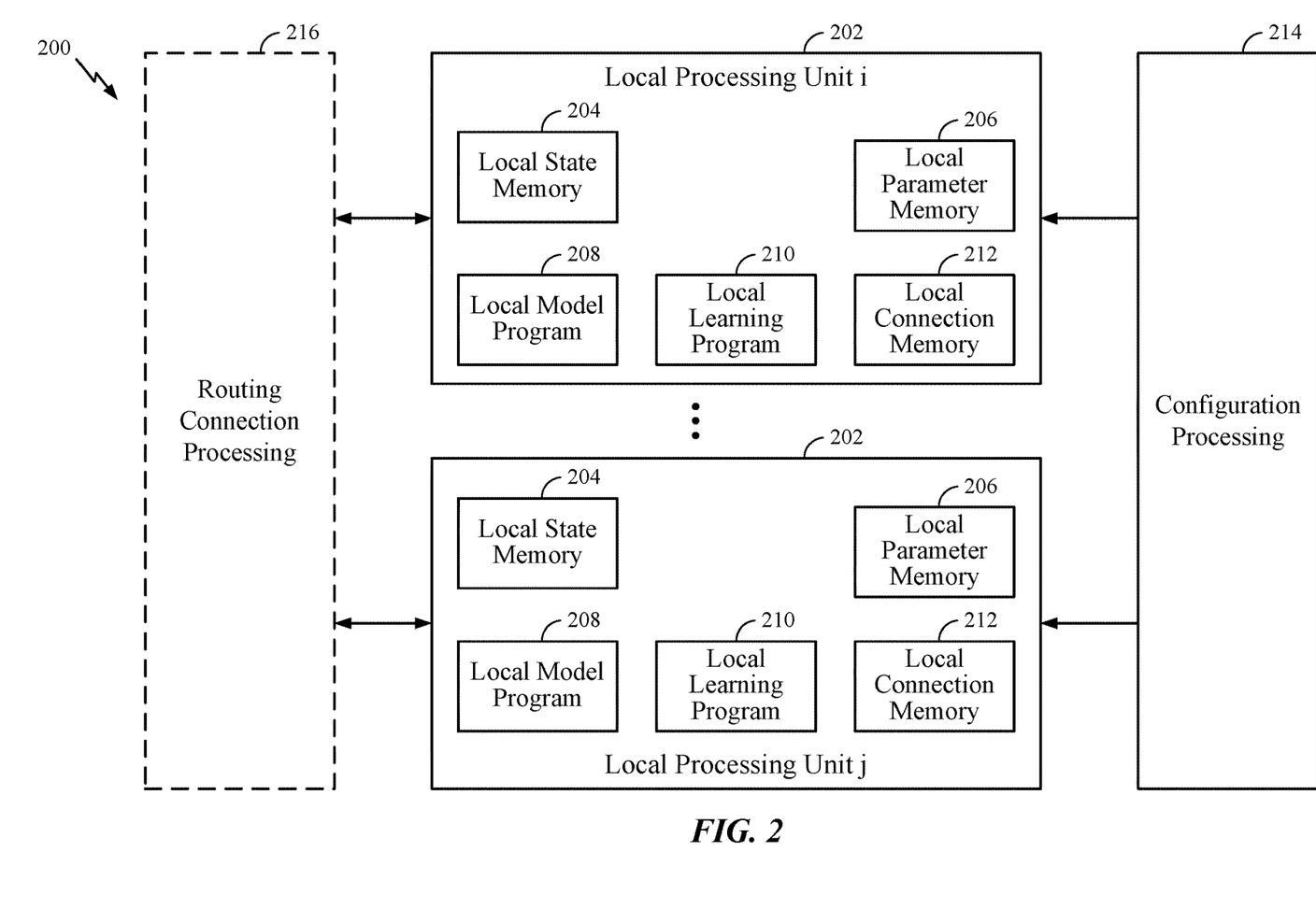
FIG. 2 illustrates an example implementation of a system in accordance with aspects of the present disclosure.

FIG. 2 illustrates an example implementation of a system 200 in accordance with certain aspects of the present disclosure. As illustrated in FIG. 2, the system 200 may have multiple local processing units 202 that may perform various operations of methods described herein. Each local processing unit 202 may comprise a local state memory 204 and a local parameter memory 206 that may store parameters of a neural network. In addition, the local processing unit 202 may have a local (neuron) model program (LMP) memory 208 for storing a local model program, a local learning program (LLP) memory 210 for storing a local learning program, and a local connection memory 212. Furthermore, as illustrated in FIG. 2, each local processing unit 202 may interface with a configuration processor unit 214 for providing configurations for local memories of the local processing unit, and with a routing connection processing unit 216 that provides routing between the local processing units 202.

Deep learning architectures may perform an object recognition task by learning to represent inputs at successively higher levels of abstraction in each layer, thereby building up a useful feature representation of the input data. In this way, deep learning addresses a major bottleneck of traditional machine learning. Prior to the advent of deep learning, a machine learning approach to an object recognition problem may have relied heavily on human engineered features, perhaps in combination with a shallow classifier. A shallow classifier may be a two-class linear classifier, for example, in which a weighted sum of the feature vector components may be compared with a threshold to predict to which class the input belongs. Human engineered features may be templates or kernels tailored to a specific problem domain by engineers with domain expertise. Deep learning architectures, in contrast, may learn to represent features that are similar to what a human engineer might design, but through training. Furthermore, a deep network may learn to represent and recognize new types of features that a human might not have considered.

A deep learning architecture may learn a hierarchy of features. If presented with visual data, for example, the first layer may learn to recognize relatively simple features, such as edges, in the input stream. In another example, if presented with auditory data, the first layer may learn to recognize spectral power in specific frequencies. The second layer, taking the output of the first layer as input, may learn to recognize combinations of features, such as simple shapes for visual data or combinations of sounds for auditory data. For instance, higher layers may learn to represent complex shapes in visual data or words in auditory data. Still higher layers may learn to recognize common visual objects or spoken phrases.

Deep learning architectures may perform especially well when applied to problems that have a natural hierarchical structure. For example, the classification of motorized vehicles may benefit from first learning to recognize wheels, windshields, and other features. These features may be combined at higher layers in different ways to recognize cars, trucks, and airplanes.

Neural networks may be designed with a variety of connectivity patterns. In feed-forward networks, information is passed from lower to higher layers, with each neuron in a given layer communicating to neurons in higher layers. A hierarchical representation may be built up in successive layers of a feed-forward network, as described above. Neural networks may also have recurrent or feedback (also called top-down) connections. In a recurrent connection, the output from a neuron in a given layer may be communicated to another neuron in the same layer. A recurrent architecture may be helpful in recognizing patterns that span more than one of the input data chunks that are delivered to the neural network in a sequence. A connection from a neuron in a given layer to a neuron in a lower layer is called a feedback (or top-down) connection. A network with many feedback connections may be helpful when the recognition of a high-level concept may aid in discriminating the particular low-level features of an input.

Figure 3A:
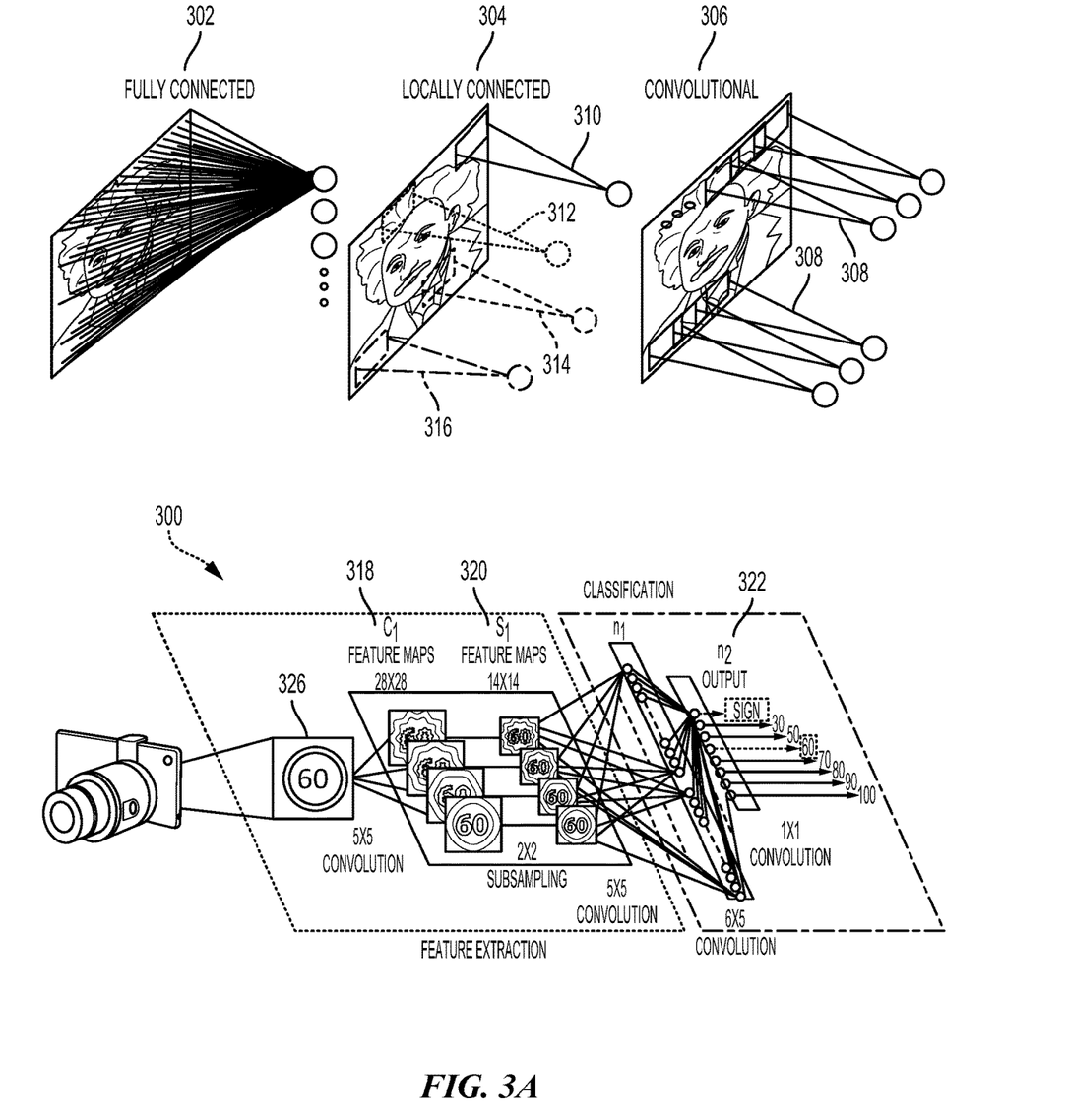
FIG. 3A is a diagram illustrating a neural network in accordance with aspects of the present disclosure.

Referring to FIG. 3A, the connections between layers of a neural network may be fully connected 302 or locally connected 304. In a fully connected network 302, a neuron in a first layer may communicate its output to every neuron in a second layer, so that each neuron in the second layer will receive input from every neuron in the first layer. Alternatively, in a locally connected network 304, a neuron in a first layer may be connected to a limited number of neurons in the second layer. A convolutional network 306 may be locally connected, and is further configured such that the connection strengths associated with the inputs for each neuron in the second layer are shared (e.g., 308). More generally, a locally connected layer of a network may be configured so that each neuron in a layer will have the same or a similar connectivity pattern, but with connections strengths that may have different values (e.g., 310, 312, 314, and 316). The locally connected connectivity pattern may give rise to spatially distinct receptive fields in a higher layer, because the higher layer neurons in a given region may receive inputs that are tuned through training to the properties of a restricted portion of the total input to the network.

Locally connected neural networks may be well suited to problems in which the spatial location of inputs is meaningful. For instance, a network 300 designed to recognize visual features from a car-mounted camera may develop high layer neurons with different properties depending on their association with the lower versus the upper portion of the image. Neurons associated with the lower portion of the image may learn to recognize lane markings, for example, while neurons associated with the upper portion of the image may learn to recognize traffic lights, traffic signs, and the like.

A deep convolutional network (DCN) may be trained with supervised learning. During training, a DCN may be presented with an image, such as a cropped image of a speed limit sign 326, and a "forward pass" may then be computed to produce an output 322. The output 322 may be a vector of values corresponding to features such as "sign," "60," and "100." The network designer may want the DCN to output a high score for some of the neurons in the output feature vector, for example the ones corresponding to "sign" and "60" as shown in the output 322 for a network 300 that has been trained. Before training, the output produced by the DCN is likely to be incorrect, and so an error may be calculated between the actual output and the target output. The weights of the DCN may then be adjusted so that the output scores of the DCN are more closely aligned with the target.

To adjust the weights, a learning algorithm may compute a gradient vector for the weights. The gradient may indicate an amount that an error would increase or decrease if the weight were adjusted slightly. At the top layer, the gradient may correspond directly to the value of a weight connecting an activated neuron in the penultimate layer and a neuron in the output layer. In lower layers, the gradient may depend on the value of the weights and on the computed error gradients of the higher layers. The weights may then be adjusted so as to reduce the error. This manner of adjusting the weights may be referred to as "back propagation" as it involves a "backward pass" through the neural network.

In practice, the error gradient of weights may be calculated over a small number of examples, so that the calculated gradient approximates the true error gradient. This approximation method may be referred to as stochastic gradient descent. Stochastic gradient descent may be repeated until the achievable error rate of the entire system has stopped decreasing or until the error rate has reached a target level.

After learning, the DCN may be presented with new images 326 and a forward pass through the network may yield an output 322 that may be considered an inference or a prediction of the DCN.

Deep belief networks (DBNs) are probabilistic models comprising multiple layers of hidden nodes. DBNs may be used to extract a hierarchical representation of training data sets. A DBN may be obtained by stacking up layers of Restricted Boltzmann Machines (RBMs). An RBM is a type of artificial neural network that can learn a probability distribution over a set of inputs. Because RBMs can learn a probability distribution in the absence of information about the class to which each input should be categorized, RBMs are often used in unsupervised learning. Using a hybrid unsupervised and supervised paradigm, the bottom RBMs of a DBN may be trained in an unsupervised manner and may serve as feature extractors, and the top RBM may be trained in a supervised manner (on a joint distribution of inputs from the previous layer and target classes) and may serve as a classifier.

Deep convolutional networks (DCNs) are networks of convolutional networks, configured with additional pooling and normalization layers. DCNs have achieved state-of-the-art performance on many tasks. DCNs can be trained using supervised learning in which both the input and output targets are known for many exemplars and are used to modify the weights of the network by use of gradient descent methods.

DCNs may be feed-forward networks. In addition, as described above, the connections from a neuron in a first layer of a DCN to a group of neurons in the next higher layer are shared across the neurons in the first layer. The feed-forward and shared connections of DCNs may be exploited for fast processing. The computational burden of a DCN may be much less, for example, than that of a similarly sized neural network that comprises recurrent or feedback connections.

The processing of each layer of a convolutional network may be considered a spatially invariant template or basis projection. If the input is first decomposed into multiple channels, such as the red, green, and blue channels of a color image, then the convolutional network trained on that input may be considered three-dimensional, with two spatial dimensions along the axes of the image and a third dimension capturing color information. The outputs of the convolutional connections may be considered to form a feature map in the subsequent layer 318 and 320, with each element of the feature map (e.g., 320) receiving input from a range of neurons in the previous layer (e.g., 318) and from each of the multiple channels. The values in the feature map may be further processed with a non-linearity, such as a rectification, max(0,x). Values from adjacent neurons may be further pooled, which corresponds to down sampling, and may provide additional local invariance and dimensionality reduction. Normalization, which corresponds to whitening, may also be applied through lateral inhibition between neurons in the feature map.

The performance of deep learning architectures may increase as more labeled data points become available or as computational power increases. Modern deep neural networks are routinely trained with computing resources that are thousands of times greater than what was available to a typical researcher just fifteen years ago. New architectures and training paradigms may further boost the performance of deep learning. Rectified linear units may reduce a training issue known as vanishing gradients. New training techniques may reduce over-fitting and thus enable larger models to achieve better generalization. Encapsulation techniques may abstract data in a given receptive field and further boost overall performance.

Figure 3B:
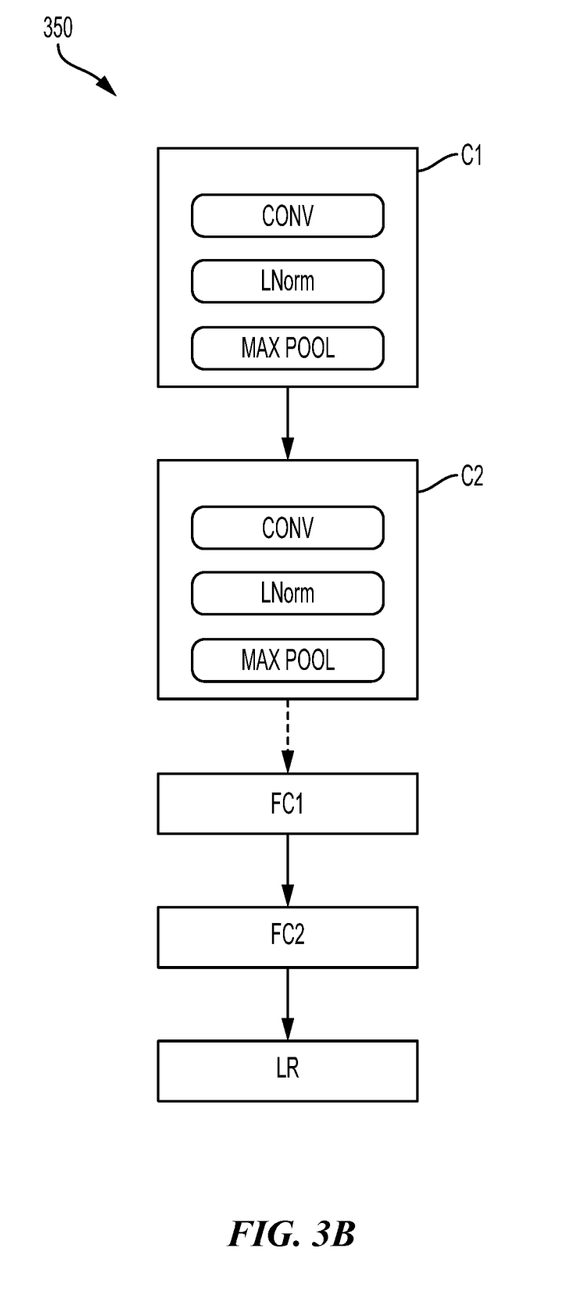
FIG. 3B is a block diagram illustrating an exemplary deep convolutional network (DCN) in accordance with aspects of the present disclosure.

FIG. 3B is a block diagram illustrating an exemplary deep convolutional network 350. The deep convolutional network 350 may include multiple different types of layers based on connectivity and weight sharing. As shown in FIG. 3B, the exemplary deep convolutional network 350 includes multiple convolution blocks (e.g., C1 and C2). Each of the convolution blocks may be configured with a convolution layer, a normalization layer (LNorm), and a pooling layer. The convolution layers may include one or more convolutional filters, which may be applied to the input data to generate a feature map. Although only two convolution blocks are shown, the present disclosure is not so limiting, and instead, any number of convolutional blocks may be included in the deep convolutional network 350 according to design preference. The normalization layer may be used to normalize the output of the convolution filters. For example, the normalization layer may provide whitening or lateral inhibition. The pooling layer may provide down sampling aggregation over space for local invariance and dimensionality reduction.

The parallel filter banks, for example, of a deep convolutional network may be loaded on a CPU 102 or GPU 104 of an SOC 100, optionally based on an ARM instruction set, to achieve high performance and low power consumption. In alternative embodiments, the parallel filter banks may be loaded on the DSP 106 or an ISP 116 of an SOC 100. In addition, the DCN may access other processing blocks that may be present on the SOC, such as processing blocks dedicated to sensors 114 and navigation 120.

The deep convolutional network 350 may also include one or more fully connected layers (e.g., FC1 and FC2). The deep convolutional network 350 may further include a logistic regression (LR) layer. Between each layer of the deep convolutional network 350 are weights (not shown) that are to be updated. The output of each layer may serve as an input of a succeeding layer in the deep convolutional network 350 to learn hierarchical feature representations from input data (e.g., images, audio, video, sensor data and/or other input data) supplied at the first convolution block C1.

Figure 4:
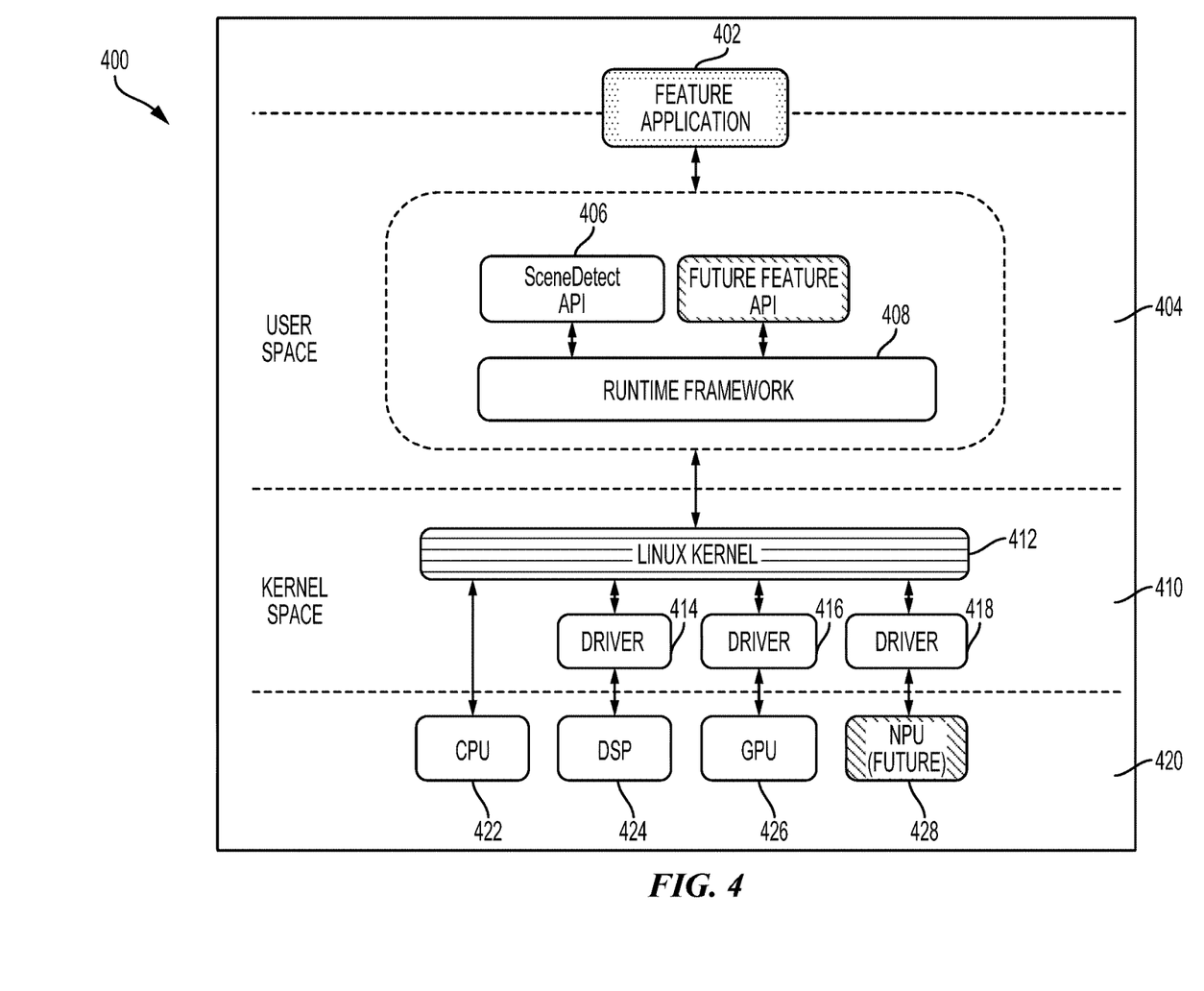
FIG. 4 is a block diagram illustrating an exemplary software architecture that may modularize artificial intelligence (AI) functions in accordance with aspects of the present disclosure.

FIG. 4 is a block diagram illustrating an exemplary software architecture 400 that may modularize artificial intelligence (AI) functions. Using the architecture, applications 402 may be designed that may cause various processing blocks of an SOC 420 (for example a CPU 422, a DSP 424, a GPU 426 and/or an NPU 428) to perform supporting computations during run-time operation of the application 402.

The AI application 402 may be configured to call functions defined in a user space 404 that may, for example, provide for the detection and recognition of a scene indicative of the location in which the device currently operates. The AI application 402 may, for example, configure a microphone and a camera differently depending on whether the recognized scene is an office, a lecture hall, a restaurant, or an outdoor setting such as a lake. The AI application 402 may make a request to compiled program code associated with a library defined in a SceneDetect application programming interface (API) 406 to provide an estimate of the current scene. This request may ultimately rely on the output of a deep neural network configured to provide scene estimates based on video and positioning data, for example.

A run-time engine 408, which may be compiled code of a Runtime Framework, may be further accessible to the AI application 402. The AI application 402 may cause the run-time engine, for example, to request a scene estimate at a particular time interval or triggered by an event detected by the user interface of the application. When caused to estimate the scene, the run-time engine may in turn send a signal to an operating system 410, such as a Linux Kernel 412, running on the SOC 420. The operating system 410, in turn, may cause a computation to be performed on the CPU 422, the DSP 424, the GPU 426, the NPU 428, or some combination thereof. The CPU 422 may be accessed directly by the operating system, and other processing blocks may be accessed through a driver, such as a driver 414-418 for a DSP 424, for a GPU 426, or for an NPU 428. In the exemplary example, the deep neural network may be configured to run on a combination of processing blocks, such as a CPU 422 and a GPU 426, or may be run on an NPU 428, if present.

Figure 5:
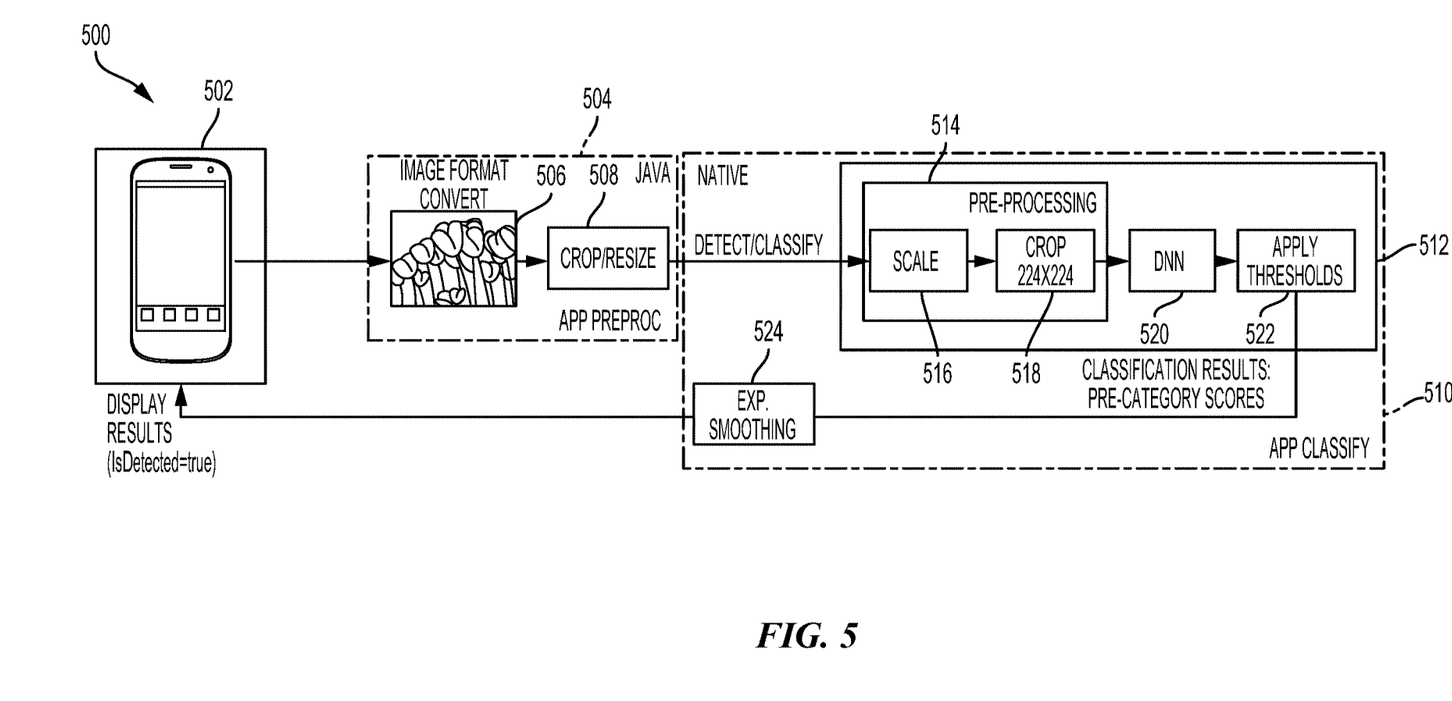
FIG. 5 is a block diagram illustrating the run-time operation of an AI application on a smartphone in accordance with aspects of the present disclosure.

FIG. 5 is a block diagram illustrating the run-time operation 500 of an AI application on a smartphone 502. The AI application may include a pre-process module 504 that may be configured (using for example, the JAVA programming language) to convert the format of an image 506 and then crop and/or resize the image 508. The pre-processed image may then be communicated to a classify application 510 that contains a SceneDetect Backend Engine 512 that may be configured (using for example, the C programming language) to detect and classify scenes based on visual input. The SceneDetect Backend Engine 512 may be configured to further preprocess 514 the image by scaling 516 and cropping 518. For example, the image may be scaled and cropped so that the resulting image is 224 pixels by 224 pixels. These dimensions may map to the input dimensions of a neural network. The neural network may be configured by a deep neural network block 520 to cause various processing blocks of the SOC 100 to further process the image pixels with a deep neural network. The results of the deep neural network may then be thresholded 522 and passed through an exponential smoothing block 524 in the classify application 510. The smoothed results may then cause a change of the settings and/or the display of the smartphone 502.

In one configuration, a machine learning model is configured for generating a feature vector from an input. The model is also configured for setting a number of elements of the feature vector to zero to produce a sparse feature vector. The machine learning model is further configured for forwarding the sparse feature vector to a classifier. The machine learning model includes generating means, setting means, and/or forwarding means. In one aspect, the generating means, setting means, and/or forwarding means may be the general-purpose processor 102, program memory associated with the general-purpose processor 102, memory block 118, local processing units 202, and or the routing connection processing units 216 configured to perform the functions recited. In another configuration, the aforementioned means may be any module or any apparatus configured to perform the functions recited by the aforementioned means.

According to certain aspects of the present disclosure, each local processing unit 202 may be configured to determine parameters of the neural network based upon desired one or more functional features of the neural network, and develop the one or more functional features towards the desired functional features as the determined parameters are further adapted, tuned and updated.

Figure 6:
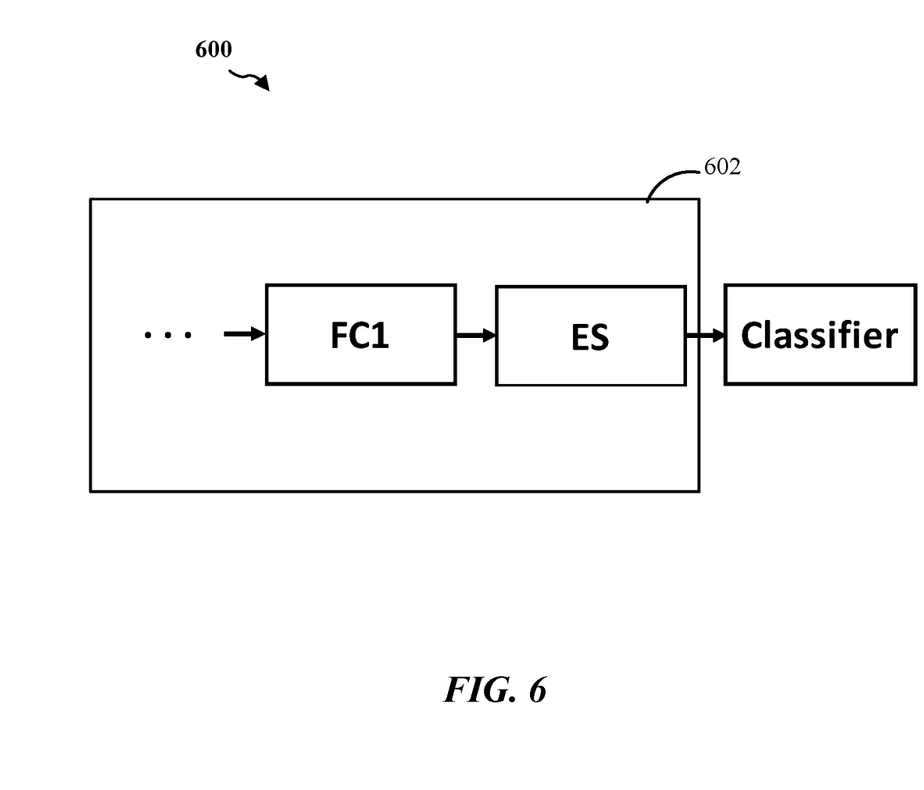
FIG. 6 is a block diagram illustrating an exemplary machine learning model including a feature extractor in accordance with aspects of the present disclosure.

FIG. 6 is a block diagram illustrating an exemplary machine learning model 600 including a feature extractor 602 in accordance with aspects of the present disclosure. Referring to FIG. 6, a fully connected layer FC1 and an enforced sparsity unity of a feature extractor 602 are shown. In some aspects, the fully connected layer may, for example comprise a layer (e.g., the last layer) of a deep convolutional network (DCN) or other network.

The fully connected layer FC1 may supply a feature vector to an enforced sparsity (ES) unit. In this exemplary configuration, an input (e.g., image pixels, speech, or the like) may be passed through multiple layers of the DCN to extract certain features and output a feature vector via the fully connected layer FC1.

Typically, DCNs may employ rectifier linear units (ReLUs) or parametric rectifier linear units (PReLUs) to rectify the data. ReLUs rectify the data by setting the negative feature vector values to 0, and keeping the positive values. PReLUs, on the other hand, keep positive feature vector values and scale the negative values linearly. Both, however, produce feature vectors with increased memory consumption and heightened latency in training and inference compared to the proposed methods of enforced sparsity.

In accordance with aspects of the present disclosure, enforced sparsity may be applied via the ES unit. That is, the data included in the feature vector may be supplied to the enforced sparsity (ES) unit to sparsify the data or render the data sparse. Using the ES unit, the top K % of data elements may be maintained, where K is an integer number. That is, the K number of elements or K % of elements having the highest value may be retained. The remaining elements of the feature vector may be set to zero. As such, a sparse feature vector having the same dimensions or number of elements as the supplied feature vector may be produced including non-zero values for only the K number of elements or K % of elements.

In some aspects, the value of K may be computed or determined offline. For example, the value of K may be determined based on a parameter sweep across various K values between 0% and 100%.

Conversely, the value of K may also be determined online. For example, the value of K may be determined by retaining a set of training and validation samples from a user and performing a sweep across K.

Although the ES unit is shown in FIG. 6 as external to the DCN, in some aspects, the ES unit may be incorporated within the DCN or other network. In one example, sparsity may be incorporated in the DCN by applying a least absolute errors (L1) cost function as part of the training procedure of the DCN or other feature extractor. In some aspects, the cost function may be configured to penalize the number of non-zero elements included in the feature vector. Furthermore, minimizing the L1 norm of the error may force the number of non-zero feature values to a smaller number. As such, the DCN may learn a sparsity factor, and in some cases, a most favorable or desirable sparsity factor of the feature vector.

In a DCN, training progresses by making the weight updates as a function of the error between the predicted label and the actual label. This error is the penalty term and one goal is to reduce the error to zero. In accordance with aspects of the present disclosure, a second penalty term may be added. The second penalty term may comprise a norm of the activations of the layer for which sparsity is desired. Because the goal is to minimize the number of non-zero elements in the feature vector, this second penalty term may in some aspects, comprise a count of the number of non-zero terms in that layer. The count of non-zero terms may be the L0 norm.

However, this quantity would not be differentiable and may lead to difficulty in training the network (e.g., using back propagation, which uses the gradient of the cost function to drive weight updates). Accordingly, in some aspects, the L1 norm (sum of the absolute values of the terms instead of count of terms) may be used as the second penalty term. By enforcing a small sum of absolute, a number of the terms may be indirectly forced to go towards zero (or very small numbers that can be thresholded down to zero).

In this paradigm an "optimal" number of non-zero terms (e.g., K) may be determined as part of the cost function minimization. In this case, the number of non-zero terms may be considered optimal because it or minimizes error as well as maximizes sparsity.

In one example, a feature vector including elements F[−1 0 2 −3 5 7 9 4 −1 2] may be supplied to the ES unit. The ES unit may, for example, be configured to keep the top 20% of the feature vector values or elements. Accordingly, the ES unit may determine the top two (2) elements or feature values of the ten (10) elements of the feature vector. Thus, the ES unit may output a modified feature vector F'[0 0 0 0 0 7 9 0 0 0] with a sparsity of non-zero feature values or elements. Accordingly, a sparse feature may be output via the ES unit and supplied to a classifier.

In some aspects, the ES unit may retain at most K % of the feature vector. Alternatively, the ES unit may retain the top K % of absolute values, positive values, or negative values of the feature vector elements. In addition, selecting the top K % is an instantiation for selecting the surviving feature values or the non-zero elements of the feature vector.

The sparse feature vector may be particularly beneficial as it may reduce memory consumption for storing features for retraining. The increased sparsity may also help enable faster classifier training and inference as fewer computations are performed. In addition, the sparse feature vector may improve classifier accuracy. Furthermore, sparse feature vectors also help to perform tasks that involve calculating distances in feature space between two or more feature vectors, for example, to form clusters of "similar" features, or build a simpler classifier like "nearest neighbor classifiers."

In some aspects, the element values of the modified feature vector may be binarized or quantized. For instance, in the example above, the binarized version of F may be F'[0 0 0 0 0 1 1 0 0 0]. The sparse feature vector may in turn be presented to a classifier.

In a second example, the element values may be quantized. In this example, all "surviving quantities" or the K highest values may be encoded with a 1 and all others with a 0. For instance, if the desired sparsity is 80% and the vector size is 10, then 8 of the lowest quantities may be set to 0 and the two surviving quantities (e.g. highest element values) to 1.

Figure 7:
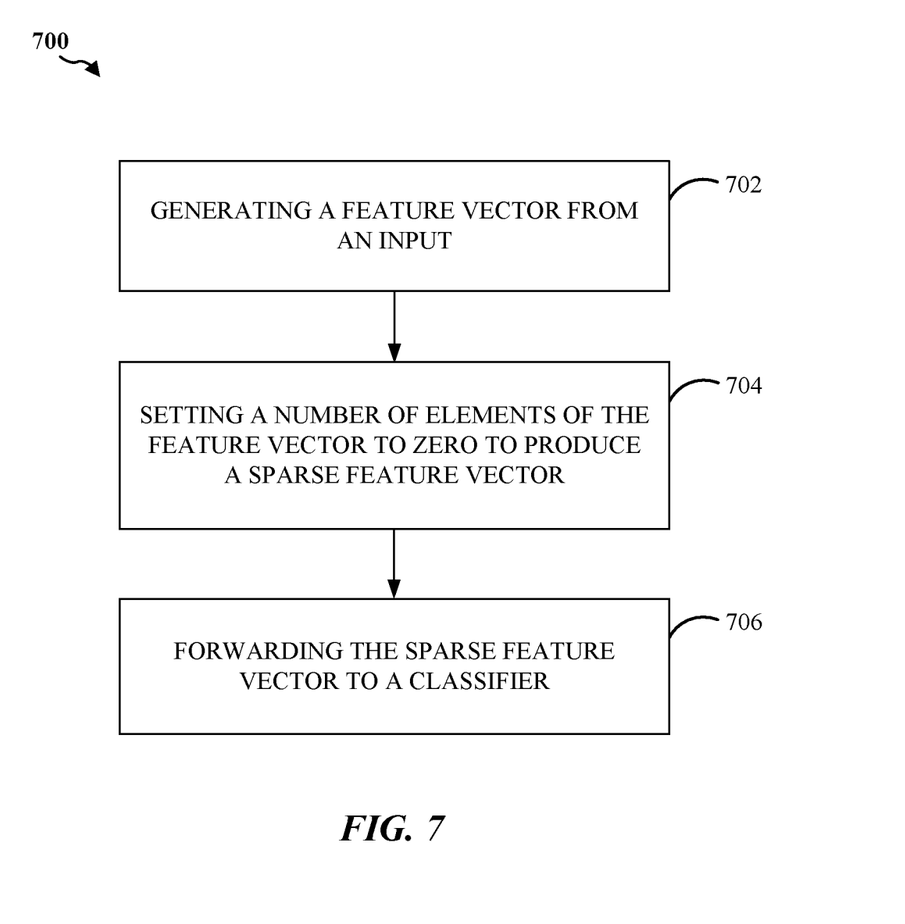
FIG. 7 illustrates a method for feature extraction and input classification according to aspects of the present disclosure.

FIG. 7 illustrates a method 700 for feature extraction and input classification. In block 702, the process generates a feature vector from an input. The input may be an image, a voice, speech, or other input data. In block 704, the process sets a number of elements of the feature vector to zero to produce a sparse feature vector. The sparse feature vector has the same dimensions as the generated feature vector and includes fewer non-zero elements than the generated feature vector.

In some aspects, the number of elements may be determined based on a performance metric such as a classifier latency, classifier accuracy, classifier speed, and/or a memory utilization, for example. The performance metric may be determined on-device (e.g., on the device performing the classification task) or off-device.

Furthermore, in block 706, the process forwards the sparse feature vector to a classifier. In some aspects, the process may further or quantize the elements of the sparse feature vector to further reduce memory consumption.

In some aspect, the process may further train the feature extractor to determine the number of elements of the feature vector to retain. The training may include the application of a cost function that penalizes low sparsity of the feature vector. In some aspects, the cost function may include least absolute errors (L1-norm) or L0 norm regularization.

In some aspects, the method 700 may be performed by the SOC 100 (FIG. 1) or the system 200 (FIG. 2). That is, each of the elements of the method 700 may, for example, but without limitation, be performed by the SOC 100 or the system 200 or one or more processors (e.g., CPU 102 and local processing unit 202) and/or other components included therein.

The various operations of methods described above may be performed by any suitable means capable of performing the corresponding functions. The means may include various hardware and/or software component(s) and/or module(s), including, but not limited to, a circuit, an application specific integrated circuit (ASIC), or processor. Generally, where there are operations illustrated in the figures, those operations may have corresponding counterpart means-plus-function components with similar numbering.

As used herein, the term "determining" encompasses a wide variety of actions. For example, "determining" may include calculating, computing, processing, deriving, investigating, looking up (e.g., looking up in a table, a database or another data structure), ascertaining and the like. Additionally, "determining" may include receiving (e.g., receiving information), accessing (e.g., accessing data in a memory) and the like. Furthermore, "determining" may include resolving, selecting, choosing, establishing and the like.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logical blocks, modules and circuits described in connection with the present disclosure may be implemented or performed with a general-purpose processor, a digital signal processor (DSP), an application specific integrated circuit (ASIC), a field programmable gate array signal (FPGA) or other programmable logic device (PLD), discrete gate or transistor logic, discrete hardware components or any combination thereof designed to perform the functions described herein. A general-purpose processor may be a microprocessor, but in the alternative, the processor may be any commercially available processor, controller, microcontroller or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the present disclosure may be embodied directly in hardware, in a software module executed by a processor, or in a combination of the two. A software module may reside in any form of storage medium that is known in the art.

Some examples of storage media that may be used include random access memory (RAM), read only memory (ROM), flash memory, erasable programmable read-only memory (EPROM), electrically erasable programmable read-only memory (EEPROM), registers, a hard disk, a removable disk, a CD-ROM and so forth. A software module may comprise a single instruction, or many instructions, and may be distributed over several different code segments, among different programs, and across multiple storage media. A storage medium may be coupled to a processor such that the processor can read information from, and write information to, the storage medium. In the alternative, the storage medium may be integral to the processor.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

The functions described may be implemented in hardware, software, firmware, or any combination thereof. If implemented in hardware, an example hardware configuration may comprise a processing system in a device. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement signal processing functions. For certain aspects, a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further.

The processor may be responsible for managing the bus and general processing, including the execution of software stored on the machine-readable media. The processor may be implemented with one or more general-purpose and/or special-purpose processors. Examples include microprocessors, microcontrollers, DSP processors, and other circuitry that can execute software. Software shall be construed broadly to mean instructions, data, or any combination thereof, whether referred to as software, firmware, middleware, microcode, hardware description language, or otherwise. Machine-readable media may include, by way of example, random access memory (RAM), flash memory, read only memory (ROM), programmable read-only memory (PROM), erasable programmable read-only memory (EPROM), electrically erasable programmable Read-only memory (EEPROM), registers, magnetic disks, optical disks, hard drives, or any other suitable storage medium, or any combination thereof. The machine-readable media may be embodied in a computer-program product. The computer-program product may comprise packaging materials.

In a hardware implementation, the machine-readable media may be part of the processing system separate from the processor. However, as those skilled in the art will readily appreciate, the machine-readable media, or any portion thereof, may be external to the processing system. By way of example, the machine-readable media may include a transmission line, a carrier wave modulated by data, and/or a computer product separate from the device, all which may be accessed by the processor through the bus interface. Alternatively, or in addition, the machine-readable media, or any portion thereof, may be integrated into the processor, such as the case may be with cache and/or general register files. Although the various components discussed may be described as having a specific location, such as a local component, they may also be configured in various ways, such as certain components being configured as part of a distributed computing system.

The processing system may be configured as a general-purpose processing system with one or more microprocessors providing the processor functionality and external memory providing at least a portion of the machine-readable media, all linked together with other supporting circuitry through an external bus architecture. Alternatively, the processing system may comprise one or more neuromorphic processors for implementing the neuron models and models of neural systems described herein. As another alternative, the processing system may be implemented with an application specific integrated circuit (ASIC) with the processor, the bus interface, the user interface, supporting circuitry, and at least a portion of the machine-readable media integrated into a single chip, or with one or more field programmable gate arrays (FPGAs), programmable logic devices (PLDs), controllers, state machines, gated logic, discrete hardware components, or any other suitable circuitry, or any combination of circuits that can perform the various functionality described throughout this disclosure. Those skilled in the art will recognize how best to implement the described functionality for the processing system depending on the particular application and the overall design constraints imposed on the overall system.

The machine-readable media may comprise a number of software modules. The software modules include instructions that, when executed by the processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module. Furthermore, it should be appreciated that aspects of the present disclosure result in improvements to the functioning of the processor, computer, machine, or other system implementing such aspects.

If implemented in software, the functions may be stored or transmitted over as one or more instructions or code on a computer-readable medium. Computer-readable media include both computer storage media and communication media including any medium that facilitates transfer of a computer program from one place to another. A storage medium may be any available medium that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Additionally, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For certain aspects, the computer program product may include packaging material.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus, comprising:
   a memory; and
   at least one processor coupled to the memory, the at least one processor configured:
   to extract features from an input stored in the memory by convolving the input with at least one filter included in a trained artificial neural network;
   to generate an initial feature vector from the extracted features, the initial feature vector comprising a plurality of elements;
   to identify a set of retained elements of the plurality of elements and a corresponding set of excluded elements of the plurality of elements, the set of retained elements comprising a quantity of elements, the quantity determined based on a performance metric and values of each of the plurality of elements in the initial feature vector, a value of each element in the set of retained elements greater than a value of each element of the set of excluded elements;
   to set the value of each element of the set of excluded elements to zero;
   to produce a sparse feature vector from the set of retained elements, the sparse feature vector having same dimensions as the initial feature vector and including fewer non-zero elements than the initial feature vector, such that an amount of the memory consumed by the sparse feature vector is less than an amount of the memory consumed by the initial feature vector;
   to store the sparse feature vector in the memory; and
   to classify the input based on the sparse feature vector stored in the memory.

2. The apparatus of claim 1, in which the at least one processor is further configured to compute the performance metric on-device.

3. The apparatus of claim 1, in which the at least one processor is further configured to compute the performance metric off-device.

4. The apparatus of claim 1, in which the at least one processor is trained to determine the quantity of elements.

5. The apparatus of claim 4, in which the at least one processor is trained using a cost function that penalizes low sparsity of the feature vector.

6. The apparatus of claim 5, in which the cost function includes an L1 norm or L0 norm.

7. The apparatus of claim 1, in which the at least one processor is further configured to binarize elements of the sparse feature vector.

8. The apparatus of claim 1, in which the at least one processor is further configured to quantize elements of the sparse feature vector.

9. A method, comprising:
   extracting features from an input stored in a memory of a device executing a trained artificial neural network by convolving the input with at least one filter included in the trained artificial neural network;
   generating an initial feature vector from the extracted features, the initial feature vector comprising a plurality of elements;
   identifying a set of retained elements of the plurality of elements and a corresponding set of excluded elements of the plurality of elements, the set of retained elements comprising a quantity of elements determined based on a performance metric and values of each of the plurality of elements in the initial feature vector, a value of each element in the of retained elements greater than a value of each element of the set of excluded elements;
   setting the value of each element of the set of excluded elements to zero;
   producing a sparse feature vector from the set of retained elements, the sparse feature vector having same dimensions as the initial feature vector and including fewer non-zero elements than the initial feature vector, such that an amount of the memory consumed by the sparse feature vector is less than an amount of the memory consumed by the initial feature vector;
   storing the sparse feature vector in the memory; and
   classifying the input based on the sparse feature vector stored in the memory.

10. The method of claim 9, further comprising computing the performance metric on-device.

11. The method of claim 9, further comprising computing the performance metric off-device.

12. The method of claim 9, further comprising determining the quantity of elements based on training.

13. The method of claim 12, in which the determining comprises training a feature extractor using a cost function that penalizes low sparsity of the feature vector.

14. The method of claim 13, in which the cost function includes an L1 norm or L0 norm.

15. The method of claim 9, further comprising binarizing elements of the sparse feature vector.

16. The method of claim 9, further comprising quantizing elements of the sparse feature vector.

17. An apparatus, comprising:
- means for extracting features from an input stored in a memory of the apparatus executing a trained artificial neural network by convolving the input with at least one filter included in the trained artificial neural network;
- means for generating an initial feature vector from the extracted features, the initial feature vector comprising a plurality of elements;
- means for identifying a set of retained elements of the plurality of elements and a corresponding set of excluded elements of the plurality of elements, the set of retained elements comprising a quantity of elements determined based on a performance metric and values of each of the plurality of elements in the initial feature vector, a value of each element in the set of retained elements greater than a value of each element of the set of excluded elements;
- means for setting the value of each element of the set of excluded elements to zero;
- means for producing a sparse feature vector from the set of retained elements, the sparse feature vector having same dimensions as the initial feature vector and including fewer non-zero elements than the initial feature vector, such that an amount of the memory consumed by the sparse feature vector is less than an amount of the memory consumed by the initial feature vector;
- means for storing the sparse feature vector in the memory; and
- means for classifying the input based on the sparse feature vector stored in the memory.

18. A non-transitory computer-readable medium having encoded thereon program code, the program code being executed by a processor and comprising:
- program code to extract features from an input stored in a memory of a device executing a trained artificial neural network by convolving the input with at least one filter included in the trained artificial neural network;
- program code to generate an initial feature vector from the extracted features, the initial feature vector comprising a plurality of elements;
- program code to identify a set of retained elements of the plurality of elements and a corresponding set of excluded elements of the plurality of elements, the set of retained elements comprising a quantity of elements determined based on a performance metric and values of each of the plurality of elements in the initial feature vector, a value of each element in the set of retained elements greater than a value of each element of the set of excluded elements;
- program code to set the value of each element of the set of excluded elements to zero;
- program code to produce a sparse feature vector from the set of retained elements, the sparse feature vector having same dimensions as the initial feature vector and including fewer non-zero elements than the initial feature vector, such that an amount of the memory consumed by the sparse feature vector is less than an amount of the memory consumed by the initial feature vector;
- program code to store the sparse feature vector in the memory; and
- program code to classify the input based on the sparse feature vector stored in the memory.

\* \* \* \* \*